(12) United States Patent
Giordano

(10) Patent No.: US 10,517,277 B2
(45) Date of Patent: Dec. 31, 2019

(54) FEED TROUGH FOR POULTRY FARMING

(71) Applicant: Giordano Poultry Plast S.p.A., Caraglio (Cuneo) (IT)

(72) Inventor: Oscar Giordano, Caraglio (IT)

(73) Assignee: GIORDANO POULTRY PLAST S.P.A., Caragilo (Cuneo) (IT)

( * ) Notice: Subject to any disclaimer, the term of this patent is extended or adjusted under 35 U.S.C. 154(b) by 388 days.

(21) Appl. No.: 15/371,734

(22) Filed: Dec. 7, 2016

(65) Prior Publication Data
US 2017/0273279 A1   Sep. 28, 2017

(30) Foreign Application Priority Data

Mar. 24, 2016   (IT) .......................... 102016000031105

(51) Int. Cl.
| | | |
|---|---|---|
| *A01K 39/01* | (2006.01) | |
| *A01K 39/014* | (2006.01) | |
| *A01K 39/012* | (2006.01) | |

(52) U.S. Cl.
CPC .......... *A01K 39/014* (2013.01); *A01K 39/012* (2013.01)

(58) Field of Classification Search
CPC ...... A01K 39/00; A01K 39/01; A01K 39/012; A01K 39/0125; A01K 39/014
See application file for complete search history.

(56) References Cited

U.S. PATENT DOCUMENTS

| | | | | |
|---|---|---|---|---|
| 3,330,255 A | * | 7/1967 | Scott .................. | A01K 39/0125 119/51.11 |
| 3,394,681 A | * | 7/1968 | Rigterink ........... | A01K 39/0125 119/57.4 |
| 3,408,988 A | * | 11/1968 | Lee .................... | A01K 39/0125 119/53 |
| 3,415,228 A | * | 12/1968 | Myers ................ | A01K 39/01 119/51.11 |
| 3,476,087 A | * | 11/1969 | Scott .................. | A01K 39/0125 119/57.4 |
| 3,485,215 A | * | 12/1969 | Scott .................. | A01K 39/0125 119/51.11 |
| 3,490,419 A | * | 1/1970 | Van Huis ........... | A01K 39/0125 119/53 |

(Continued)

FOREIGN PATENT DOCUMENTS

| | | | | |
|---|---|---|---|---|
| CA | 2490757 A1 | * | 1/2004 | ......... A01K 39/0125 |
| EP | 1145631 | | 10/2001 | |

(Continued)

OTHER PUBLICATIONS

Italian Search Report for Italian Application No. 102016000031105, dated Nov. 4, 2016.

*Primary Examiner* — Monica L Williams
*Assistant Examiner* — Michael A. Fabula
(74) *Attorney, Agent, or Firm* — Heslin Rothenberg Farley & Mesiti P.C.; Victor A. Cardona, Esq.

(57) ABSTRACT

A feeding trough for poultry farming includes automatic dispensing of feed from a vertically displaceable horizontal dispensing tube, formed by just three pieces. One of the pieces is a plate formed in one piece with a ring which in a lowered position of the bell-like housing opens a crown of apertures and in a raised position of the bell-like housing closes the crown of apertures so as to reduce the amount of feed transferred to the plate. The feed trough is also configured to facilitate periodic rinsing thereof.

2 Claims, 5 Drawing Sheets

(56) References Cited

U.S. PATENT DOCUMENTS

| | | | | |
|---|---|---|---|---|
| 3,511,215 A * | 5/1970 | Myers | A01K 39/0125 | 119/53 |
| 3,545,408 A * | 12/1970 | Wert | A01K 39/0125 | 119/51.11 |
| 3,566,843 A * | 3/1971 | Van Huis | A01K 39/0125 | 119/53 |
| 3,585,970 A * | 6/1971 | Scott | A01K 39/0125 | 119/53 |
| 3,598,087 A * | 8/1971 | Ramser | A01K 39/0125 | 119/51.11 |
| 3,628,505 A * | 12/1971 | Myers | A01K 39/0125 | 119/57.4 |
| 3,811,412 A * | 5/1974 | Murto | A01K 39/0125 | 119/53 |
| 3,827,405 A * | 8/1974 | Allen | A01K 39/0125 | 119/53 |
| 3,908,601 A * | 9/1975 | Geary | A01K 15/02 | 119/57.4 |
| 3,911,868 A * | 10/1975 | Brembeck | A01K 39/0125 | 119/53 |
| 3,971,340 A * | 7/1976 | Allen | A01K 39/0125 | 119/57.4 |
| 4,216,742 A * | 8/1980 | Kirchhofer | A01K 39/0125 | 119/457 |
| 4,317,430 A * | 3/1982 | Swartzendruber | A01K 39/0125 | 119/57.4 |
| 5,092,274 A * | 3/1992 | Cole | A01K 39/0125 | 119/53 |
| 5,097,797 A * | 3/1992 | Van Zee | A01K 39/0125 | 119/57.4 |
| 5,101,766 A * | 4/1992 | Runion | A01K 39/0125 | 119/53 |
| 5,275,131 A * | 1/1994 | Brake | A01K 39/0125 | 119/52.4 |
| 5,311,839 A * | 5/1994 | Pollock | A01K 39/0125 | 119/53 |
| 5,406,907 A * | 4/1995 | Hart | A01K 39/0125 | 119/53 |
| 5,724,912 A * | 3/1998 | Cull | A01K 39/0125 | 119/57.2 |
| 5,778,821 A * | 7/1998 | Horwood | A01K 39/0125 | 119/53 |
| 5,875,733 A * | 3/1999 | Chen | A01K 39/0125 | 119/53 |
| 5,927,232 A * | 7/1999 | Pollock | A01K 39/0125 | 119/53 |
| 5,957,083 A * | 9/1999 | Cheng | A01K 39/0125 | 119/53 |
| 6,050,220 A * | 4/2000 | Kimmel | A01K 39/0125 | 119/53 |
| 6,173,676 B1 | 1/2001 | Cole | | |
| 9,591,833 B1 * | 3/2017 | McGregor | A01K 39/01 | |
| 2002/0139310 A1 * | 10/2002 | Hight | A01K 5/0114 | 119/57.1 |
| 2002/0152965 A1 * | 10/2002 | Turner | A01K 39/0125 | 119/53 |
| 2005/0072365 A1 * | 4/2005 | Busses | A01K 39/01 | 119/57.7 |
| 2005/0076842 A1 * | 4/2005 | Busse | A01K 39/0125 | 119/57.7 |
| 2013/0098297 A1 * | 4/2013 | Chen | E06B 5/00 | 119/51.01 |
| 2013/0139755 A1 * | 6/2013 | Steudler, Jr. | A01K 39/0125 | 119/51.01 |
| 2013/0139757 A1 * | 6/2013 | Steudler, Jr. | A01K 39/0125 | 119/52.1 |
| 2013/0139758 A1 * | 6/2013 | Steudler, Jr. | A01K 39/0125 | 119/53 |
| 2016/0095300 A1 * | 4/2016 | Steudler, Jr. | A01K 39/01 | 119/51.01 |
| 2016/0305622 A1 * | 10/2016 | Baker, Jr. | A01K 39/00 | |

FOREIGN PATENT DOCUMENTS

| | | |
|---|---|---|
| EP | 1195087 | 4/2002 |
| EP | 2277374 | 1/2011 |

* cited by examiner

FEED TROUGH FOR POULTRY FARMING

CROSS-REFERENCE TO RELATED APPLICATIONS

This application claims priority from Italian patent application No. 102016000031105, filed on Mar. 24, 2016, the entire disclosure of which is incorporated herein by reference.

FIELD OF THE INVENTION

The present invention generally regards feed troughs for poultry farming, for example of the type described in document EP-2277374 in the name of the same Applicant, and more in particular it regards a feeding trough with automatic dispensing of the feed from a vertically displaceable horizontal dispensing tube.

STATE OF THE ART

Feed troughs of this type typically comprise a bell-shaped housing superiorly provided with a tubular connector for attachment to the dispensing tube and introduction of feed thereinto, and a plate arranged beneath the bell-like housing to receive the feed. There are provided for means for adjusting the amount of feed transferred from the bell-like housing to the plate actuated following lowering or raising of the horizontal dispensing tube and consequent relative vertical displacement between the bell-like housing and the plate between a lowered and a raised position.

Feeding troughs of this type, whose example is described and illustrated in document EP-1195087, can be advantageously used in chicken and turkey farms both when weaning chicks, in which case the feeding troughs are arranged in a lowered position with respect to the ground to allow the chicks easy access to the plate, and for the subsequent fattening of the animals where the feeding troughs are raised from the ground to allow the adult chicken easy access to the plate.

In the solution known from the aforementioned document EP-1195087, the feeding trough is formed by a plurality of elements: a main vertical tubular body, a supply collar, an outer cone, an inner cone, another vertical tubular body and a plate.

From EP-1145631 a similar feeding trough is known which is also comprising at least five different components.

Thus, the construction of a feeding trough thus made requires designing and manufacturing a series of moulds with the ensuing entailed high costs. In addition, the assembly of several elements is complicated and tedious whereas the configuration and shape of the feeding troughs disassembled for transportation does not allow easy packaging thereof. A further drawback lies in the challenges faced when rinsing the feeding troughs for periodical cleaning thereof.

SUMMARY OF THE INVENTION

The object of the present invention is to overcome the aforementioned drawbacks, and such object is attained due to the characteristics outlined in the claims, in particular due to the fact that the feeding trough is formed by just three components: a clamping element with the dispensing tube thereof, a bell-like housing superiorly formed in one piece with a tubular connector that can be coupled to the clamping element and inferiorly provided with a crown of apertures, and a plate formed in one piece both with a dome that defines with the bell-like housing an annular chamber for the flow of the feed from the tubular connector to the plate and with a ring for opening and closing the crown of apertures adjusting the amount of feed transferred to the plate.

This configuration not only allows considerably reducing production costs with respect to feeding troughs of the prior art that require a high number of moulds, but also an easier and quicker mutual assembly of the three elements that form the feeding trough. A further advantage of the invention lies in the fact that both the plate and the bell-like housing are shaped in such a manner to enable an easy superimposition in stacks to considerably reduce the space occupied during transportation.

The invention is also comprising a washing system of the interior of the feeding trough.

BRIEF DESCRIPTION OF THE FIGURES

The invention will now be described in detail, purely by way of non-limiting example, with reference to the attached drawings, wherein.

DETAILED DESCRIPTION OF THE INVENTION

According to the distinctive characteristic of the invention, the feeding trough comprises only three elements made of high resistance moulded plastic material, easily assemblable.

Figure 1:
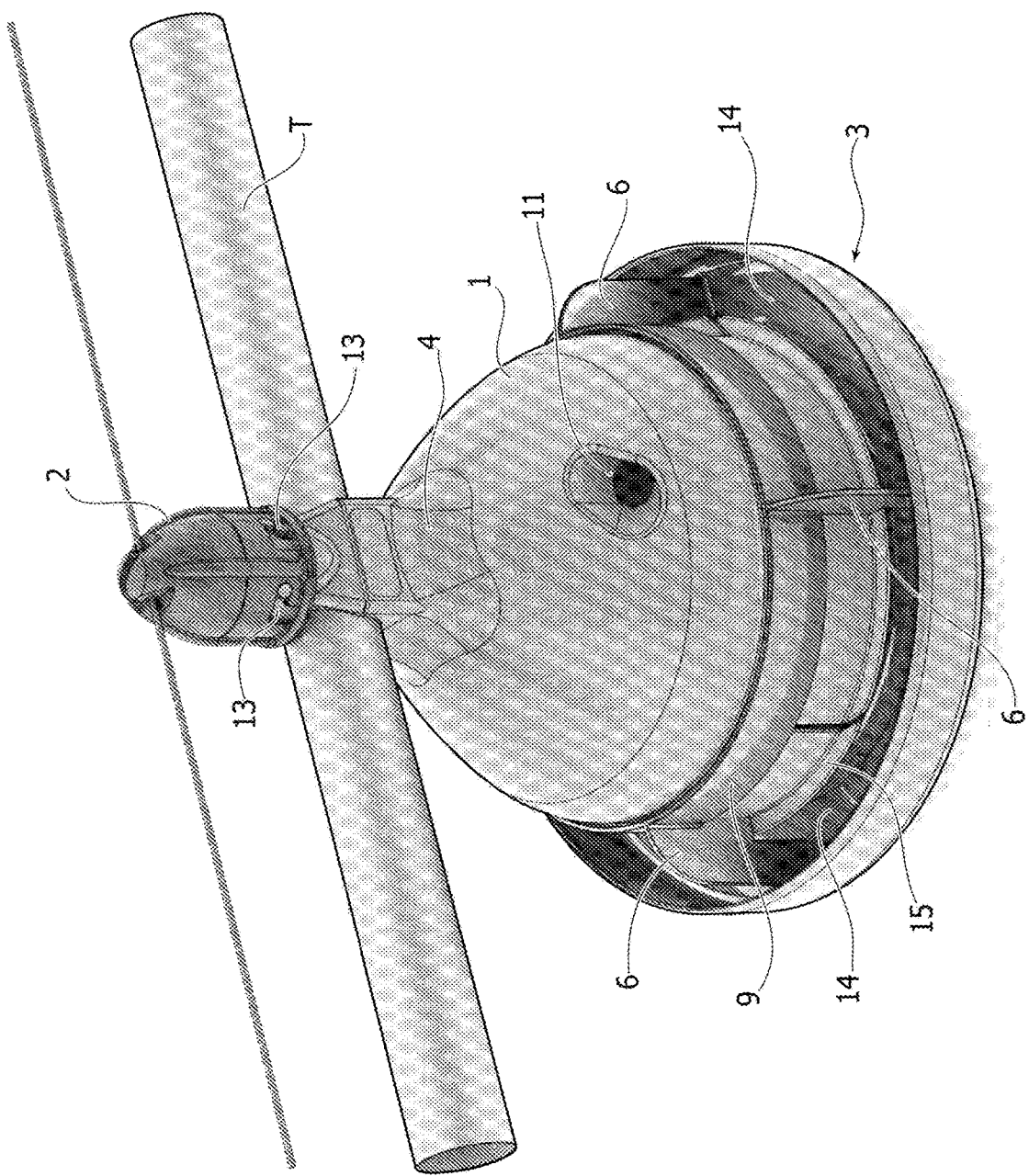
FIG. 1 is a perspective view of a feeding trough according to the invention.
Figure 2:
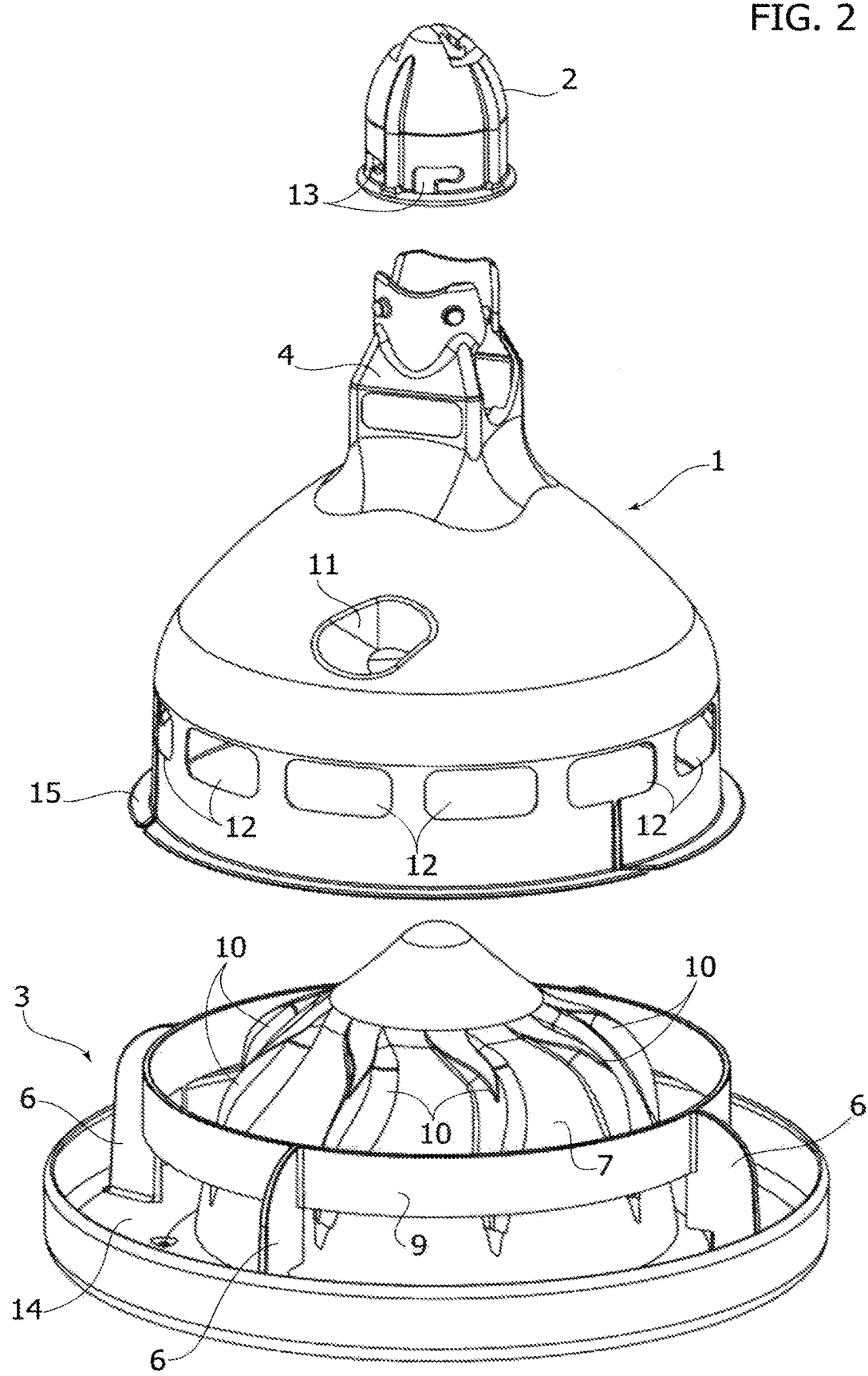
FIG. 2 is an exploded perspective view of the feeding trough.

With reference to FIGS. 1 and 2 a first element consists in a dome-shaped clamping element 2 adapted to stably connect to a horizontal tube T for dispensing the feed, a substantially bell-shaped housing 1, which forms the second component. The bell-like housing 1 is superiorly obtained as a single piece with a tubular connector 4 that can be coupled with the clamping element 2 through a bayonet coupling 13.

The bell-like housing 1 is provided with a through hole 11 for introducing a lance or the like for dispensing a pressurised liquid for rinsing the feeding trough. Inferiorly, the bell-like housing 1 has a crown of apertures 12 typically shaped to form rectangular or oval-shaped slots equally shaped and adapted, as better described hereinafter, for the flow of the feed in the lowered position of the feeding trough.

A third and last component of the feeding trough is made up of a plate 3 predisposed for a vertically slidable and rotatble coupling with the bell-like housing 1. The plate 3 defines—at the lower part thereof—an annular container 14 of the feed and it is centrally formed in a single piece with the dome 7 which extends upwards and it is adapted to form with the bell-like housing 1, in the use configuration of the feeding trough, an annular chamber 8. Such annular chamber 8 allows the flow of the feed from the horizontal dispensing tube T, through the integrally joined tubular connector 4 up to the annular container 14 of the plate 3.

The plate 3 further comprises a coaxial ring 9 connected by means of vertical radial septa 6 to the annular container 14 of the plate 3. The ring 9, alongside the vertical radial septa 6, is obtained as a single piece with the plate 3, it is adapted to open or close the crown of apertures 12 of the bell-like housing 1 depending on the relative vertical position thereof with respect to the bell-like housing 1.

Figure 3:
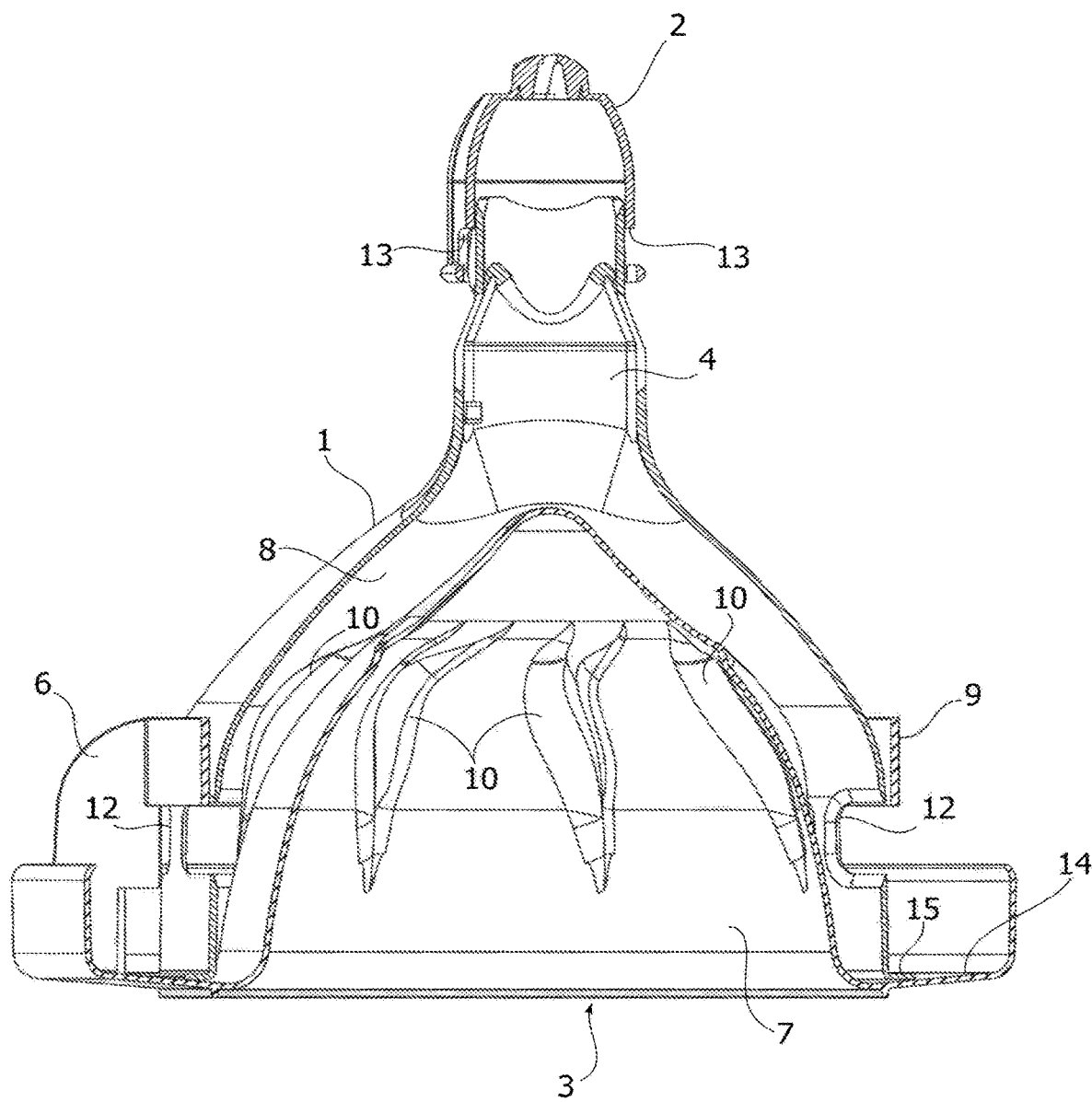
FIG. 3 is a sectional front view of the feeding trough, in a lowered configuration.

FIG. 3 shows a section of the feeding trough according to the invention in a lowered operative configuration for weaning chicks, in which the dispensing flow of the feed is maximum. In such configuration, the ring 9 of the plate 3 is superiorly arranged at the crown of apertures 12 of the bell-like housing 1 so that such apertures 12 are open. The feed dispensed by the horizontal tube T descends along the annular chamber 8, projects from the apertures 12 and deposits on the annular container 14 of the plate 3.

Figure 4:
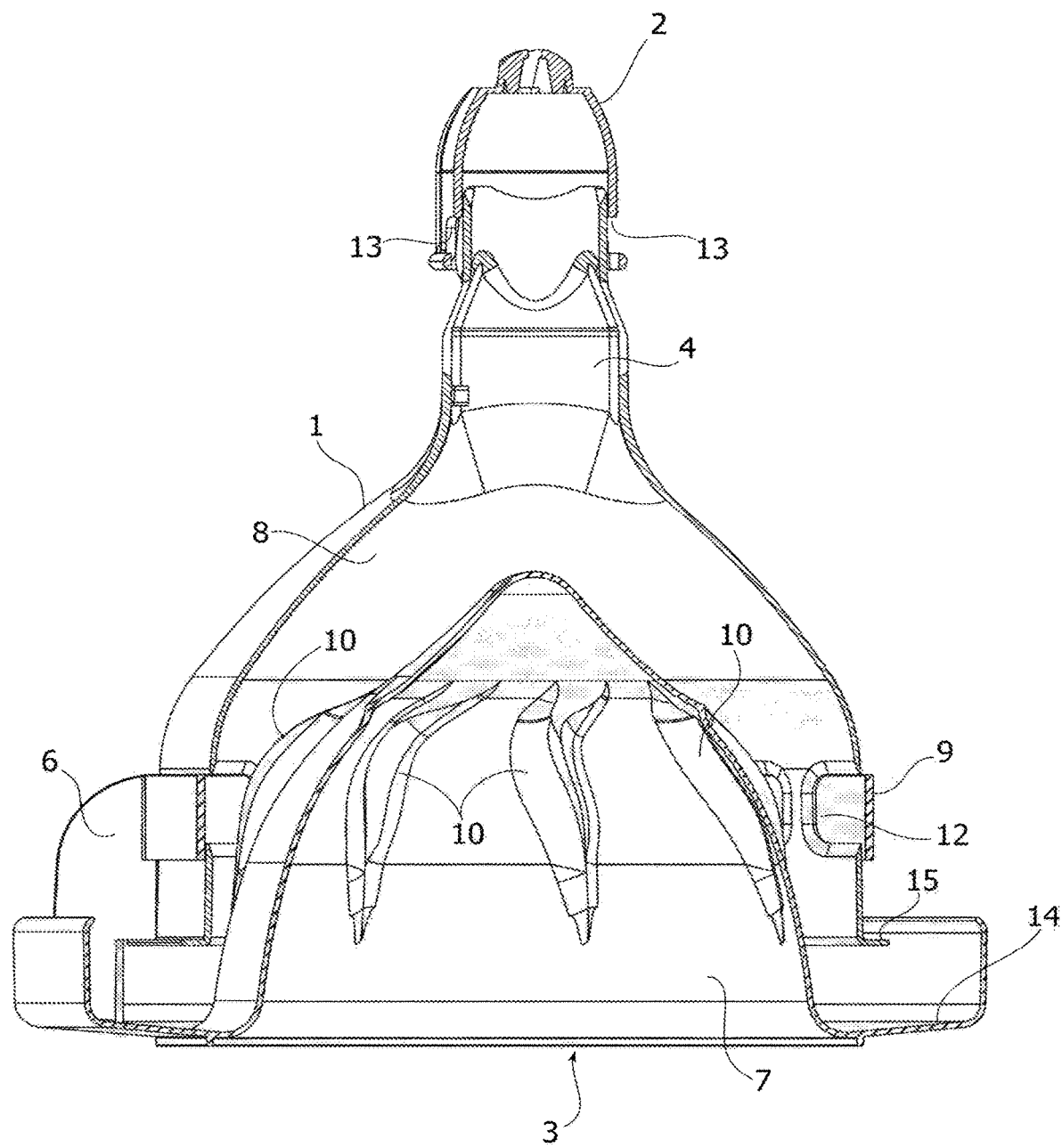
FIG. 4 is a sectional front view of the feeding trough, in a raised configuration.

FIG. 4 shows the feeding trough in a raised position for fattening adult poultry.

Raising the dispensing tube T allows an upward displacement of the bell-like housing 1 with respect to the plate 3: the ring 9 is the plate 3 is thus arranged in front of the apertures 12 of the bell-like housing 1, closing them. Thus, the flow of the feed from the annular chamber 8 to the annular container 14 of the plate 3 occurs beneath the base of the bell-like housing 1.

In this position, a lower annular flange 15 of the bell-like housing 1 is locked by the septa 6 of the plate 3 as represented in FIGS. 1 and 4.

Figure 5:
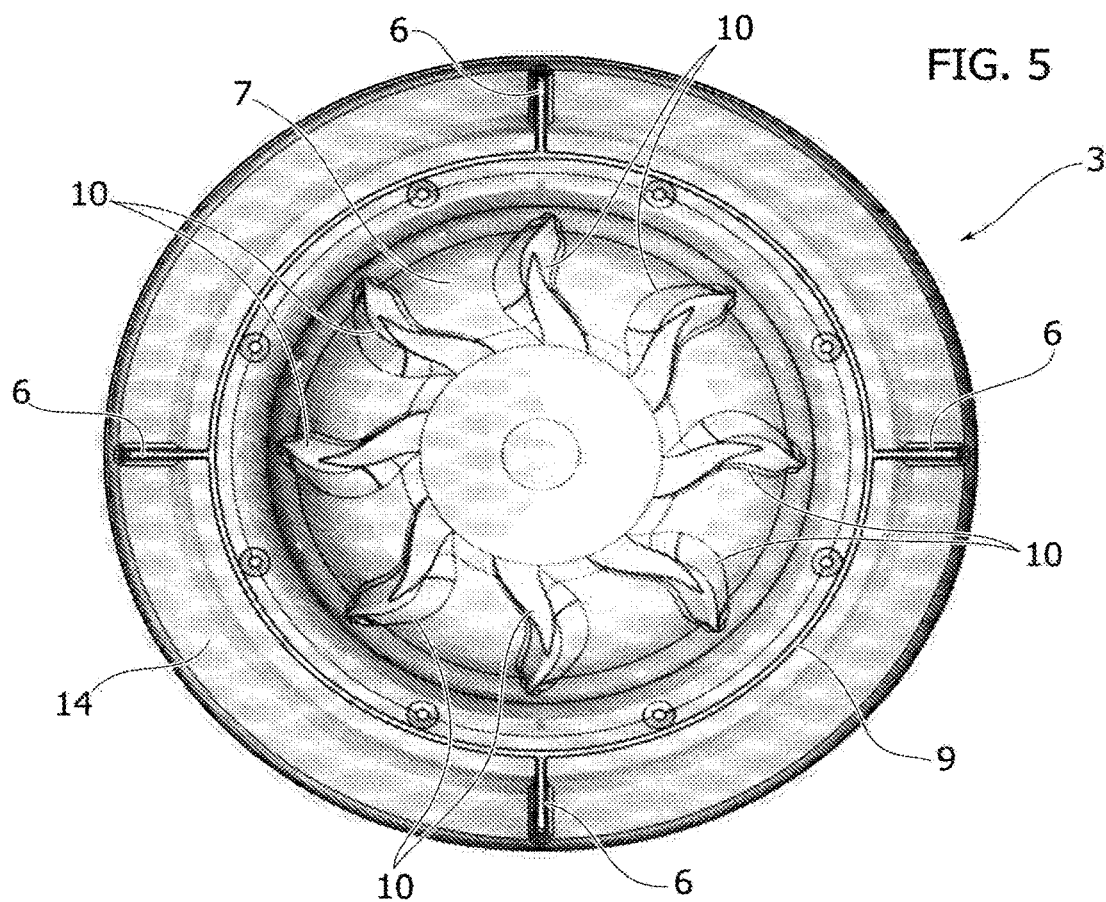
FIG. 5 is a top view of the plate of the feeding trough.

A further advantageous characteristic of the invention is illustrated in FIG. 5, which shows the dome 7 of the plate 3 of the feeding trough on the outer surface of which a plurality of substantially helical reliefs 10 arranged circumferentially is formed.

When rinsing the feeding trough using pressurised liquid introduced into the annular chamber 8 through the through hole 11 of the bell-like housing 1, the pressure of the liquid exerted on the reliefs 10 rotatably drives the plate 3 which, as mentioned, is rotatably coupled with the bell-like housing 1. The centrifuge force resulting from the relative movement of the plate 3 with respect to the bell-like housing 1 increases the rinsing efficiency.

Figure 6:
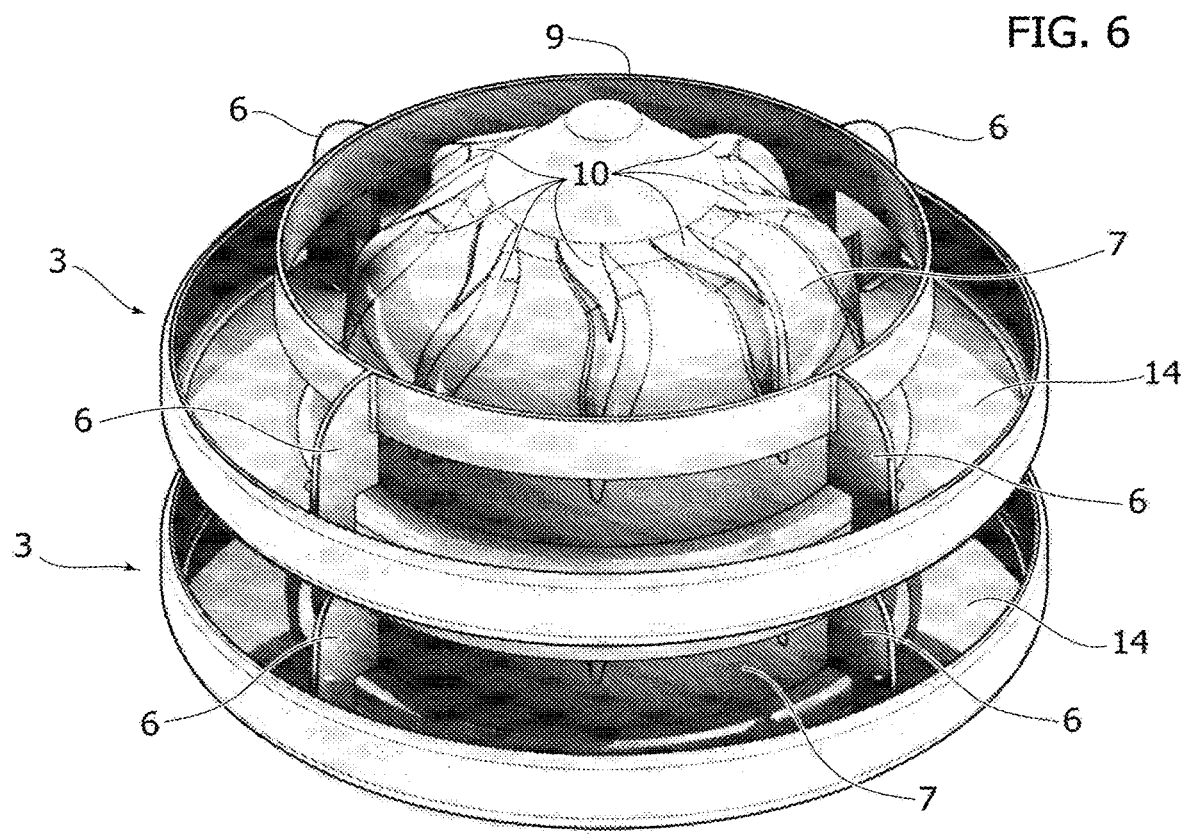
FIG. 6 is a perspective view of two plates stacked for transportation.

FIG. 6 shows two plates 3 with the relative domes 7 conveniently stacked for transport in a minimum overall dimension configuration.

Obviously, the construction details and the embodiments may widely vary with respect to what has been described and illustrated, without departing from the scope of protection of the present invention as described in the claims that follow.

The invention claimed is:

1. A feeding trough for poultry farming, wherein the feed is automatically supplied from a vertically displaceable horizontal dispensing tube, comprising:
    a bell-shaped housing provided superiorly with an attachment member for connecting to the horizontal feeding tube having a tube opening,
    the attachment member comprising a tubular connector formed in one piece with the bell-shaped housing and a clamping element secured to said tubular connector, the attachment member having an attachment opening,
    a plate arranged beneath the bell-shaped housing to receive the feed, wherein the plate is movably coupled to the housing,
    said bell-shaped housing being vertically displaceable between a lowered position and a raised position relative to said plate,
    the bell-shaped housing provided inferiorly with a crown of apertures,
    the plate formed in one piece with a dome configured to extend within the bell-shaped housing and defining therewith an annular chamber for the passage of the feed from the tube, through the tube opening, the attachment opening, and the annular chamber to the plate,
    the plate formed in one piece with a ring, said ring located exterior to the housing and above said crown of apertures in the lowered position of the bell-shaped housing such that said crown of apertures are open, and said ring located in front of said crown of apertures in the raised position of the bell-shaped housing such that said crown of apertures is closed to reduce the amount of feed transferred to the plate relative to the lowered position,
    said plate being rotatable relative to the bell-shaped housing, and
    said dome comprising substantially helical projections and said bell-like housing comprising an inlet hole, wherein said inlet hole is located relative to said substantially helical projections such that a liquid under pressure introduced through said inlet hole rotatably drives said plate to rinse the feeding trough.

2. A washable feeding trough, wherein feed is automatically supplied from a vertically displaceable horizontal dispensing tube, the feeding trough comprising:
    a bell-shaped housing provided superiorly with an attachment member for connecting to the horizontal feeding tube having a tube opening,
    the attachment member comprising a tubular connector formed in one piece with the bell-shaped housing and a clamping element secured to said tubular connector, the attachment member having an attachment opening,
    a plate arranged beneath the bell-shaped housing to receive feed, wherein the plate is movably coupled to the bell-shaped housing,
    said bell-shaped housing being vertically displaceable between a lowered position and a raised position relative to said plate,
    a dome formed in one piece with the plate, wherein the plate is rotatable relative to the bell-shaped housing, and
    said dome extending within the bell-shaped housing and defining an annular chamber therewith,
    a plurality of substantially helical projections formed on the dome, and
    said bell-shaped housing comprising an inlet hole, said inlet hole located relative to said substantially helical projections such that a liquid under pressure introduced through said inlet hole and into the annular chamber rotatably drives said plate to rinse the feeding trough.

* * * * *